(12) United States Patent
Nohara et al.

(10) Patent No.: US 9,910,456 B2
(45) Date of Patent: Mar. 6, 2018

(54) INFORMATION PROCESSING DEVICE

(71) Applicant: LENOVO (SINGAPORE) PTE. LTD., Singapore (SG)

(72) Inventors: Ryota Nohara, Kanagawa-ken (JP); Takehito Yamauchi, Kanagawa-ken (JP); Takane Fujino, Kanagawa-ken (JP); Yoshiyuki Shibayama, Gunma-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 15/242,114

(22) Filed: Aug. 19, 2016

(65) Prior Publication Data
US 2017/0052563 A1 Feb. 23, 2017

(30) Foreign Application Priority Data

Aug. 19, 2015 (JP) .................. 2015-161915

(51) Int. Cl.
*G06F 1/16* (2006.01)
(52) U.S. Cl.
CPC .......... *G06F 1/1616* (2013.01); *G06F 1/1681* (2013.01)
(58) Field of Classification Search
CPC ........ G06F 1/1656; G06F 1/16; G06F 1/1616; G06F 1/1681; G06F 17/50; G06F 1/1613; G06F 1/1626; G06F 1/1628; G06F 1/1637; G06F 1/181; G06F 1/203; G06F 2200/1633; G06F 1/1679; G06F 1/1683; H05K 5/0217; H05K 5/0247; H05K 5/03; H05K 9/0045; H05K 13/00; H05K 5/0086; H05K 5/0226; H05K 5/0239; H05K 9/0007; H05K 9/0084

USPC ..................... 361/679.27, 679.29
See application file for complete search history.

(56) References Cited

U.S. PATENT DOCUMENTS

| | | | |
|---|---|---|---|
| 5,169,724 A * | 12/1992 | Fogarty ............... | H01R 13/035 427/405 |
| 2010/0317239 A1* | 12/2010 | Achammer .......... | H01R 12/585 439/676 |
| 2016/0187933 A1* | 6/2016 | Nelson ................. | G06F 1/1681 361/679.11 |

FOREIGN PATENT DOCUMENTS

| | | |
|---|---|---|
| JP | 2001015938 A | 1/2001 |
| JP | 2005149463 A | 6/2005 |
| JP | 2008083807 A | 4/2008 |
| JP | 2010009385 A | 1/2010 |
| JP | 2012169347 A | 9/2012 |

(Continued)

*Primary Examiner* — Anthony Haughton
*Assistant Examiner* — Ingrid Wright
(74) *Attorney, Agent, or Firm* — Russell Ng PLLC; Anthony P. Ng

(57) ABSTRACT

An information processing device is disclosed. The information processing device includes a first chassis and a second chassis that are connected rotatably via a hinge, and includes a connector to connect the first chassis to the hinge. The first chassis includes a laminated part having a lamination of a set of fiber-reinforced plastic layers in each of which resin is reinforced by fibers arranged in a predetermined direction. The connector is attached and fixed to a recess in the laminated part, with the recess having a shape corresponding an outer shape of the connector. Directly attached to the connector, one of the fiber-reinforced plastic layers making up a bottom of the recess and is a layer in which fibers are arranged in a direction orthogonal to a rotary axis of the hinge.

12 Claims, 3 Drawing Sheets

(56) References Cited

FOREIGN PATENT DOCUMENTS

JP 2015046471 A 3/2015

\* cited by examiner

| | CONVENTIONAL CONNECTION STRUCTURE | CONNECTION STRUCTURE OF PRESENT EMBODIMENT |
|---|---|---|
| THE NUMBER OF TIMES OF OPENING/CLOSING | 31,500 | 100,000 |
| THE NUMBER OF TIMES OF DROPPING FROM CORNER BY 70 cm | ONCE | FOUR TIMES |
| FORCED-OPENING TOLERANCE | 3.1 kgf | 5.5 kgf OR MORE |

INFORMATION PROCESSING DEVICE

PRIORITY CLAIM

The present application claims benefit of priority under 35 U.S.C. §§120, 365 to the previously filed Japanese Patent application No. JP2015-161915 with a priority date of Aug. 19, 2015, which is incorporated by reference herein.

BACKGROUND OF THE INVENTION

1. Technical Field

The present invention relates to electronic apparatuses in general, and particularly to an information processing device having a first chassis and a second chassis that are connected rotatably via a hinge.

2. Description of Related Art

Some laptop personal computers (PCs) include an input-part chassis having input devices such as a keyboard and a pointing device, and a display-part chassis having a display. The input-part chassis is typically connected rotatably to the display-part chassis via a hinge. Such laptop PCs are required to be thinner and more lightweight for better portability.

In order to a thinner and more lightweight display-part chassis, a laptop PC having a rear-face cover of the chassis can be made of fiber-reinforced plastic. Carbon fiber-reinforced plastic (CFRP) can ensure predetermined strength even when the chassis is thin and lightweight. Thus, CFRP is a suitable material for the chassis in order to implement a thinner and more lightweight laptop PC.

When an display-part chassis and an input-part chassis are connected via a hinge, and when the chassis is made of resin, a boss may be integrally formed during injection molding, whereby the hinge can be fastened with a screw at the boss. If fiber-reinforced plastic such as CFRP were to be used; however, a boss cannot be integrally formed.

As a solution, a part of the CFRP corresponding to the hinge can be cut out, and the hinge is fastened with a screw to another member prepared by injection molding in order to bond to the cutout. With this configuration, connection strength that is enough for normal operation can be secured. However, for more expanded usage scenarios of laptop PCs, they need to be stronger.

SUMMARY OF THE INVENTION

In accordance with a preferred embodiment of the present invention, an information processing device includes a first chassis and a second chassis that are connected rotatably via a hinge, and includes a connector for connecting the first chassis to the hinge. The first chassis includes a laminated part having a lamination of multiple fiber-reinforced plastic layers in each of which resin is reinforced by fibers arranged in a predetermined direction. The connector is attached and fixed to a recess in the laminated part, The recess includes a shape corresponding an outer shape of the connector, and one of the fiber-reinforced plastic layers making up a bottom of the recess and is directly attached to the connector is a layer, in which fibers are arranged in a direction orthogonal to a rotary axis of the hinge.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
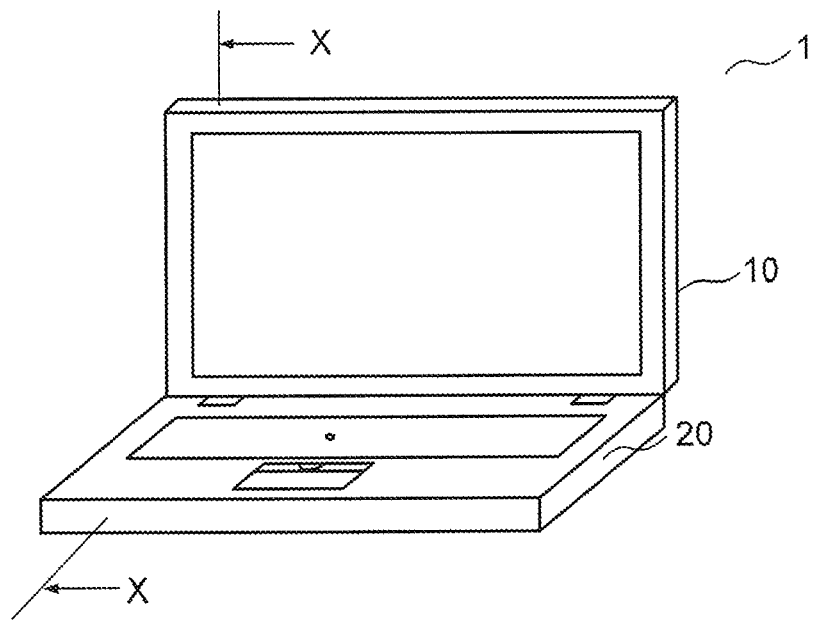
FIGS. 1A-1B show a perspective view and a cross-sectional side view of an information processing device, respectively, according to a preferred embodiment of the present invention.
Figure 1B:
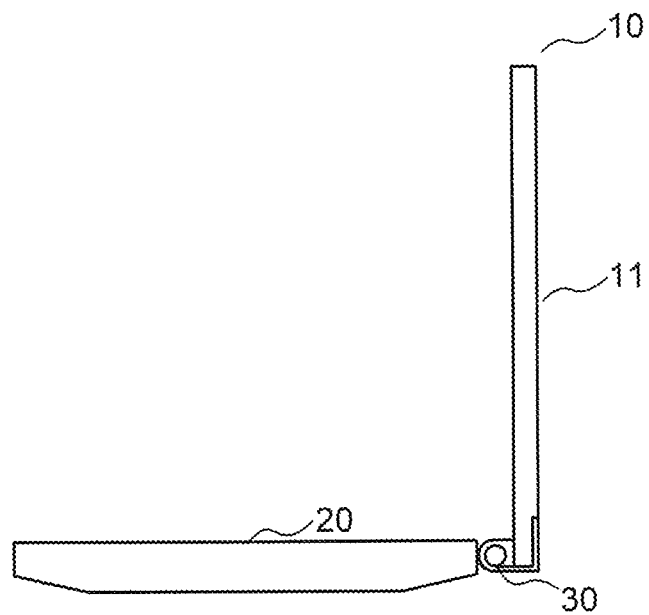

Referring now to the drawings and in particular to FIGS. 1A-1B, there are depicted a perspective view and a cross-sectional side view of an information processing device, respectively, according to a preferred embodiment of the present invention. As shown in FIG. 1A, an information processing device 1 includes a first chassis 10 and a second chassis 20. The first chassis 10 is a display chassis encasing a display, and the second chassis 20 is an input-part chassis having input devices such as a keyboard and a pointing device.

FIG. 1B is a cross-sectional view taken along line X-X in FIG. 1A. As shown in FIG. 1B, the first chassis 10 and the second chassis 20 are connected via a hinge 30, and are configured rotatably about the rotary axis of the hinge 30. One end of the hinge 30 is connected to the second chassis 20 with a connection structure (not illustrated) such as screwing. The other end of the hinge 30 is connected to a rear-face cover 11 of the first chassis 10. The other end of the hinge 30 may be connected not only to the rear-face cover of the first chassis 10, but also to another member of the first chassis 10, e.g., a surface cover opposed to the rear-face cover.

Figure 2:
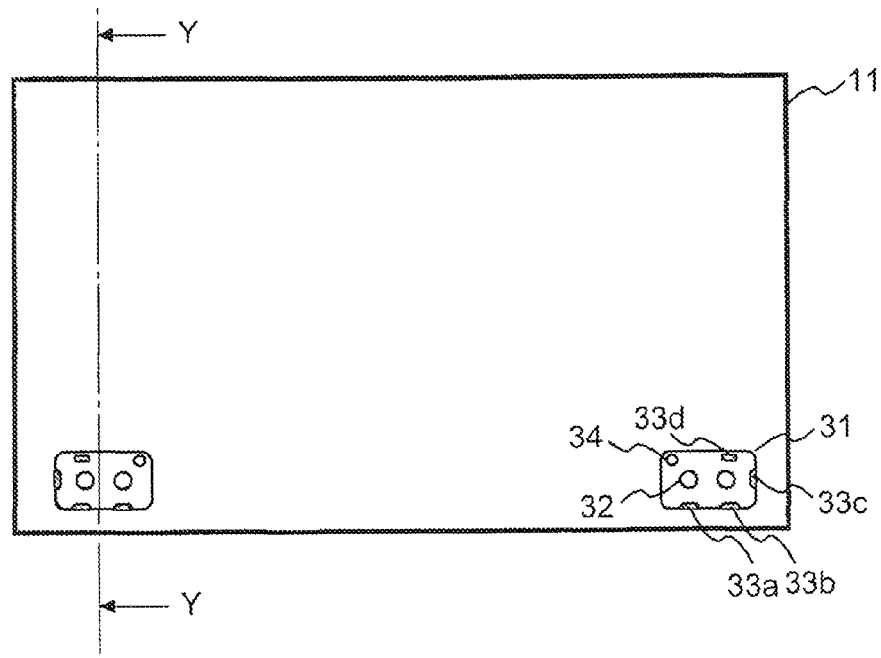
FIG. 2 shows the rear-face cover of the information processing device from FIG. 1A.

With reference now to FIG. 2, there is depicted the rear-face cover of the information processing device that is viewed from the inner side. The rear-face cover 11 is configured by stacking layers of carbon fiber-reinforced plastic (CFRP) and glass fiber-reinforced plastic (GFRP), and the details thereof are described later. As shown in FIG. 2, the rear-face cover 11 has a recess, to which a connector 31 is attached and fixed, and the connector 31 can be connected to the hinge 30 by fastening with screws at screw holes 32 formed at the connector 31. The recess is formed corresponding to the outer shape of the connector 31, and a layer making up a bottom of the recess and an attachment face of the connector 31 are attached and fixed. The connector 31 is a substantially rectangle in outer shape, in which grooves 33a to 33d are formed from the attachment face to a surface opposed to the attachment face. The grooves 33a to 33c are disposed in the vicinity of sides that do not include a predetermined corner 34 to be like a cutout to the face connecting the attachment face and the surface. The groove 33d is disposed as a through hole that penetrates through the attachment face to the surface in the vicinity of the periphery of a side that does not include the corner 34. As a result, the grooves 33a to 33d may be disposed from the attachment face to the surface, and may be configured as a cutout to the side face or as a through hole. With such a configuration of the grooves 33a to 33d, the connector 31 may have a predetermined space around there. The grooves 33a to 33d are attached so as to be filled with adhesive 40 described later.

The connector 31 is preferably made of metal so as to be resistant to a force applied thereto, and is made of light metal, such as aluminum alloy, more preferably because the device can be lightweight. Still more preferably, the surface of the light metal is anodized because the adhesive strength with the adhesive can increase.

Figure 3:
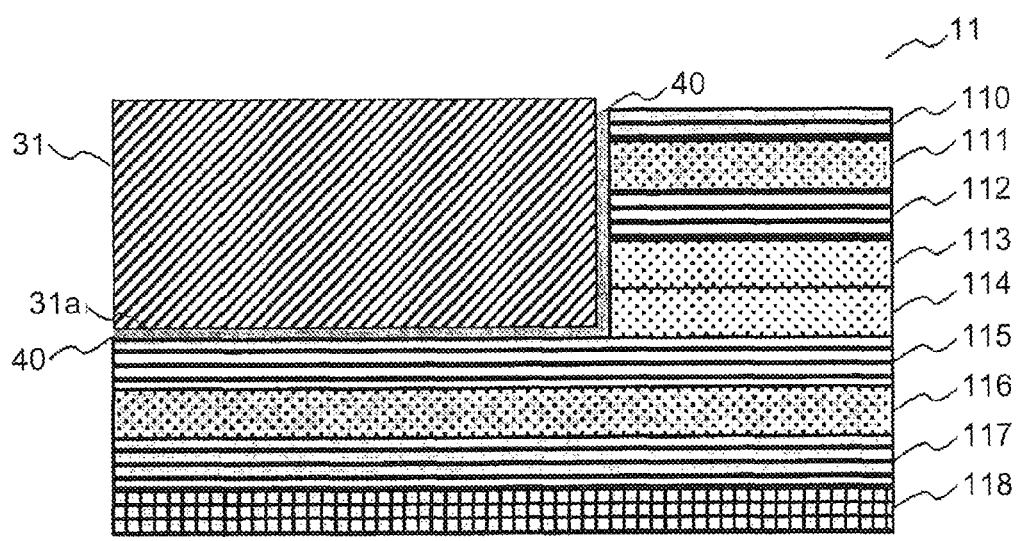
FIG. 3 shows a cross-sectional view of a line Y-Y of the connection structure from FIG. 2.

Referring now to FIG. 3, there is depicted a part of the Y-Y cross section of the connection structure according to the present embodiment. As shown in FIG. 3, the rear-face cover 11 includes multiple layers that are stacked. Specifically, CFRP layers 110, 111, 116, 117 and 118 and GFRP layers 112, 113, 114 and 115 are stacked. The layers 110, 112, 115 and 117 are configured so that their fibers are arranged in the transverse direction in the drawing, i.e, in the direction orthogonal to the rotary axis of the hinge 30, whereas the layers 111, 113, 114 and 116 are configured so that their fibers are arranged in the depth direction in the drawing, i.e., in the direction parallel to the rotary axis of the hinge 30. The layer 118 is configured so that the fibers are arranged like a net, i.e., in the directions orthogonal to and parallel to the rotary axis of the hinge 30.

In such a rear-face cover 11, a recess is formed by removing a part of the layers 110, 111, 112, 113 and 114 so as to correspond to the shape of the connector 31. The bottom of the recess is the layer 115, in which the fibers are arranged in the direction orthogonal to the rotary axis of the hinge 30. The layer 115 and the attachment face 31a of the connector 31 are attached and fixed with adhesive 40. The adhesive 40 reaches the surface of the layer 110, whereby the connector 31 is connected not only to the layer 115 but also to the cross sections of the layers 110 to 114, and therefore the adhesive strength can increase. As the adhesive 40, existing adhesive, such as epoxy-based adhesive, may be used that is suitable for adhesion between fiber-reinforced plastic and metal.

In the present embodiment, when the connector 31 is attached to the rear-face cover 11, the predetermined corner 34 may be used as a reference. Specifically, the adhesive 40 is poured into the rear-face cover 11 having a recess corresponding to the shape of the connector 31, and the predetermined corner 34 is positioned. Then, attachment is started from the predetermined corner 34, and then attachment is performed gradually toward a corner opposed to the predetermined corner 34. Thereby, air bubbles generated between the adhesive 40 and the connector 31 can be removed, so that the contacting area between the adhesive 40 and the connector 31 increases, and the adhesive strength can increase accordingly. During such attachment, air bubbles generated in this step can be collected at the grooves 33 that are disposed in the area that are attached during the latter half of the attachment, i.e., in the vicinity of the sides that do not include the predetermined corner 34, and therefore more stable attachment is enabled.

Figures 4, 5:
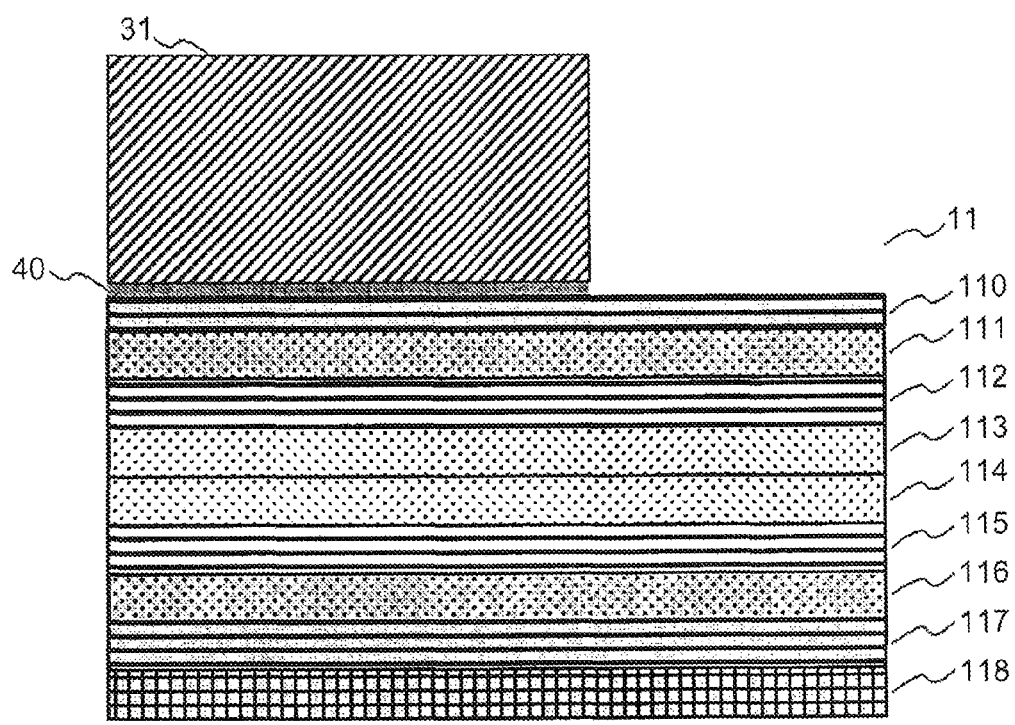
FIG. 4 shows a cross-sectional view of a conventional connection structure.
FIG. 5 is a table showing the results of a strength comparison test between the connection structure according to the present invention and the conventional connection structure.

With reference now to FIG. 4, there is shown the cross section of a conventional connection structure. As shown in FIG. 4, adhesive 40 is applied on the outermost layer 110 of the rear-face cover 11 made up of layers 110 to 118 stacked, and then a connector 31 is attached there.

Referring now to FIG. 5, there is illustrated a table showing the result of the strength comparison test between the connection structure of the present invention and the conventional connection structure. While the operation to open/close the display chassis was successfully performed 31,500 times for the conventional connection structure, such operation was successfully performed 100,000 times for the connection structure of the present invention. In the drop test in which the device was dropped from a corner of the chassis by 70 cm, while the conventional structure resisted the test only once, the connection structure of the present invention resisted four times. In the forced-opening tolerance test, in which a force that can be applied more from the maximum-opening state was measured, while the connector 31 was peeled from the rear-face cover 11 at 3.1 kgf for the conventional connection structure, no peeling occurred in the connection structure of the present invention even with a force of 5.5 kgf. In this way, the adhesive strength of the connection structure of the present invention was greatly improved as compared with the conventional connection structure.

That is the detailed descriptions of a preferable embodiment of the present invention, and the present invention is not limited to such a specific embodiment, and can be variously modified or changed without departing from the spirit of the present invention specified in the claims. For instance, although the above embodiment describes the case where the connector 31 is attached to the rear-face cover 11 of the first chassis 10 as a display chassis, the connection structure can be applied to the case where the connector is attached to another part, e.g., the surface cover of the second chassis 20 as the input-part chassis.

As has been described, the present disclosure provides an information processing device having a first chassis and a second chassis that are connected rotatably via a hinge.

While the disclosure has been particularly shown and described with reference to a preferred embodiment, it will be understood by those skilled in the art that various changes in form and detail may be made therein without departing from the spirit and scope of the disclosure.

What is claimed is:

1. An information processing device comprising:
   a first chassis includes a face cover having a plurality of fiber-reinforced plastic layers, wherein said face cover includes a recess;
   a connector located within said recess of said face cover, wherein said connector includes at least one screw hole;
   a second chassis rotatably connected to said first chassis; and
   a hinge for connecting said second chassis to said connector located within said recess of said face cover of said first chassis.

2. The information processing device of claim 1, wherein said connector further includes at least one groove disposed from an attachment face of said connector to be attached to said recess to a surface opposed to said attachment face.

3. The information processing device of claim 2, wherein said at least one groove includes a cutout to a face connecting said attachment face and said surface opposed to said attachment face.

4. The information processing device of claims 2, wherein said at least one groove is filled with adhesive for attaching said connector to said recess.

5. The information processing device of claim 1, wherein said at least one screw hole penetrates through an attachment face of said connector to a surface opposed to said attachment face of said connector.

6. The information processing device of claims 1, wherein an attachment face of said connector to be attached to said recess is substantially rectangle in outer shape.

7. The information processing device of claims 1, wherein said connector is rigid.

8. The information processing device of claim 1, wherein said connector is made of metal.

9. The information processing device of claim 8, wherein a surface of said metal is anodized.

10. The information processing device of claim 1, wherein said plurality of fiber-reinforced plastic layers includes carbon fiber-reinforced plastic layers and glass fiber-reinforced plastic layers.

11. The information processing device of claim 1, wherein said first chassis contains a display.

12. The information processing device of claim 1, wherein said second chassis contains a keyboard.

* * * * *